Figure 1:
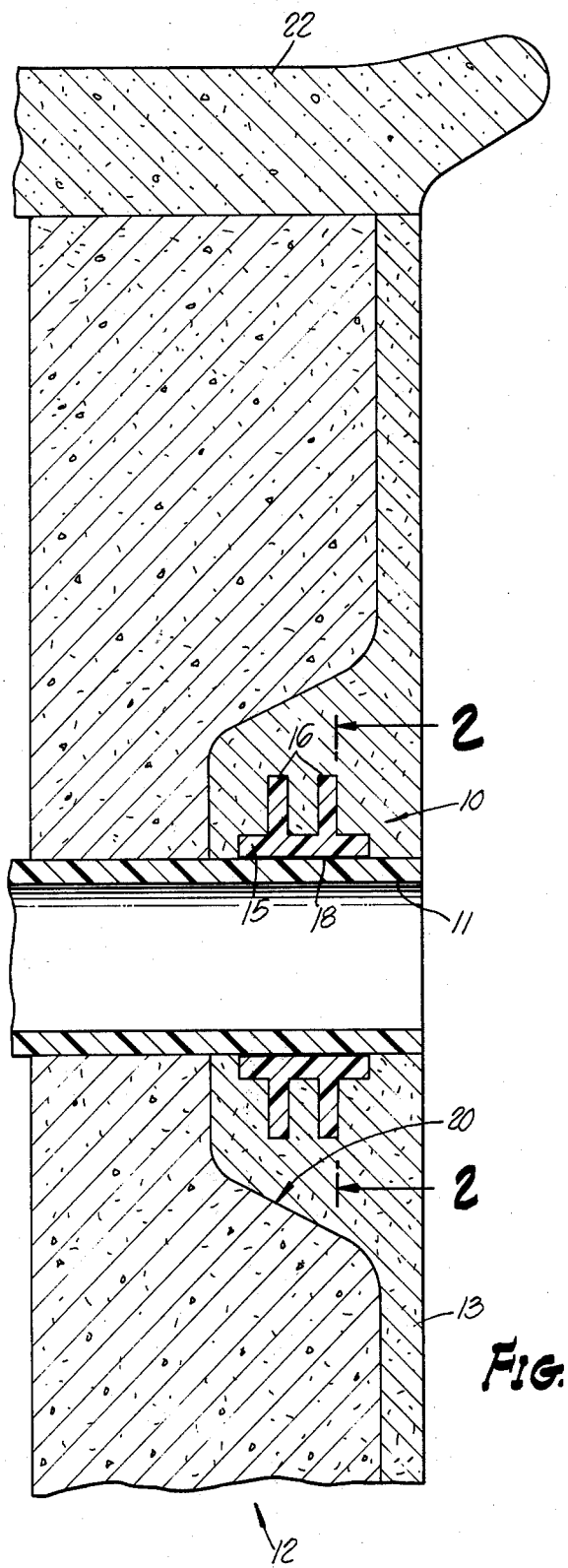

ized Patent [19] [11] 4,063,759

Steimle [45] Dec. 20, 1977

[54] WATER BARRIER TO PREVENT SEEPAGE PAST PIPES INSTALLED THROUGH A MASONRY WALL

[76] Inventor: Wayne D. Steimle, 8808 Las Tunas Drive, San Gabriel, Calif. 91776

[21] Appl. No.: 684,273

[22] Filed: May 7, 1976

[51] Int. Cl.² ............................................... F16L 5/02
[52] U.S. Cl. ......................................... 285/189; 4/172
[58] Field of Search ............... 285/192, 189, 230, 288, 285/291; 4/172, 172.17, 172.18, 172.19, 172.21

[56] References Cited

U.S. PATENT DOCUMENTS

| 1,855,258 | 4/1932 | Sirch | 4/172.17 |
| 2,073,784 | 3/1937 | Day | 4/172.17 X |
| 2,729,093 | 1/1956 | Ridley | 4/172 X |
| 3,278,949 | 10/1966 | Whitaker | 4/172 |
| 3,591,190 | 7/1971 | Winay et al. | 285/189 X |
| 3,759,285 | 9/1973 | Yoakum | 285/230 X |
| 3,787,061 | 1/1974 | Yoakum | 285/189 X |
| 3,787,078 | 1/1974 | Williams | 285/189 |
| 3,874,063 | 4/1975 | Skinner et al. | 285/189 X |
| 3,914,843 | 10/1975 | Antonacci | 285/238 X |

FOREIGN PATENT DOCUMENTS

| 1,314,345 | 4/1973 | United Kingdom | 285/230 |
| 1,337,540 | 11/1973 | United Kingdom | 285/189 |

Primary Examiner—Thomas F. Callaghan
Attorney, Agent, or Firm—Sellers and Brace

[57] ABSTRACT

A water barrier device for assembly about a pipe passing through a masonry wall to prevent seepage of water along the interface between the exterior of the pipe and the wall material. The barrier comprises a tubular sleeve and encircled by flanges having a fluid-tight fit with the pipe along a portion thereof embedded in and sealed to an impervious coating for the wall surface.

4 Claims, 2 Drawing Figures

U.S. Patent  Dec. 20, 1977  4,063,759

WATER BARRIER TO PREVENT SEEPAGE PAST PIPES INSTALLED THROUGH A MASONRY WALL

This invention relates to fluid seals, and more particularly to a water barrier sleeve snugly embracing the portion of a pipe passing through a masonry wall and the exterior surface of which sleeve is embedded in and adherent to a waterproof coating for the wall and effective to prevent seepage of water along the interface between the pipe and the masonry wall.

Heretofore, there has existed a long-standing problem in providing a reliable and fluid-tight seal between the exterior of a pipe or conduit and a masonry wall through which the pipe passes. One of the many operating environments presenting this problem and herein pointed out solely by way of example are the water circulating and drainage pipes installed through the walls and bottoms of masonry swimming pools. Such pipes are customarily located below ground and below the water level in the pool with the result that persons not aware of the problems are oblivious to the fact that considerable quantities of water are lost from the pool by seepage along the exterior portion of the pipe passing through the wall. The inwardly facing surface of such walls are customarily coated with a waterproof layer of coating material but the thickness of this layer in contact with the exterior surface of the pipe is so shallow that there seldom is an inadequate sealing bond with the exterior of the pipe in contact therewith. Moreover, this coating is readily chipped or damaged at its point of contact with the pipe during use of the pool resulting in failure of any initial seal which may have been present.

The foregoing and related problems attending the lack of an effective and reliable seal between a pipe or conduit in a masonry wall through which is passes are avoided by the present invention.

These objectives are accomplished simply and in a most economical and facile manner by providing the wall with an enlarged concavity surrounding the exit area for the pipe on the side of the wall to which the waterproof coating is to be applied. This concavity is sufficiently large as to readily receive the invention water barrier device here shown by way of example as comprising a sleeve having a close sliding fit with the exterior of the pipe and an expansive exterior surface area providing a foolproof seal with the wall sealing coat. This exterior area is conveniently provided in the form of one or more outwardly projecting flanges in intimate sealing contact with the wall waterproof coating. In consequence, the barrier device is completely embedded in the coating providing a foolproof and fully reliable barrier preventing any possibility of water leakage in either direction therepast.

It is therefore a primary object of this invention to provide a simply constructed water barrier device adapted to be snugly telescoped over a conduit in an area thereof passing through masonry and adapted to be embedded in a waterproof coating applied to one side of the wal.

Another object of the invention is the provision of a water barrier device comprising a tubular sleeve embraced by one or more large area, outwardly projecting flanges encircling the same and adapted to be in sealing contact with a waterproof coating for the wall.

Another object of the invention is the provision of improved means for providing a water seal between the exterior of a pipe passing through a swimming pool wall and the waterproof lining for that wall.

These and other more specific objects will appear upon reading the following specification and claims and upon considering in connection therewith the attached drawing to which they relate.

Figure 2:
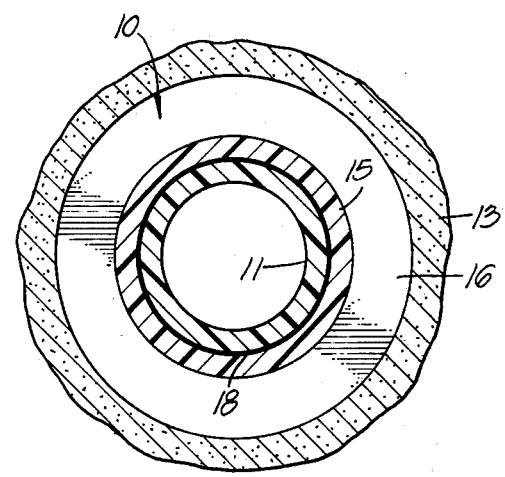

Referring now to the drawing in which a preferred embodiment of the invention is illustrated:

FIG. 1 is a fragmentary cross-sectional view through a pool wall showing an illustrative embodiment of the invention installed therein; and FIG. 2 is a cross-sectional view along line 2—2 of FIG. 1.

Referring to FIG. 1, there is shown an illustrative embodiment of the invention barrier device, designated generally 10, in a typical operating environment, namely, on a return water conduit 11 passing through the sidewall of a wall 12 of a swimming pool below the normal water level thereof. It will be understood that pipe 11 represents any of several pipes which pass through the wall including the pool drain pipe.

Wall 12 may be of any masonry construction including Gunite. The side thereof normally in contact with the water contents of the pool is covered with a thick waterproof coating 13 of any well known suitable composition.

The barrier device 10 as here shown is molded in one piece from a suitable plastic composition. The main body 15 comprises a tubular sleeve having a telescopic fit with the exterior of pipe 11. Projecting outwardly from the exterior of sleeve 15 are at least one and preferably a plurality of annular flanges 16. These flanges together with the exposed exterior portions of sleeve 15 provide large surface areas to which the waterproof coating 13 is strongly adherent in a watertight manner. To safeguard against the possibility of water seepage between the exterior of pipe 11 and the interior surface of sleeve 15, a suitable adhesive or bonding agent 18 is preferably applied to these surfaces at the time of assembly of the barrier device over the end of pipe 11.

The installation of the invention barrier is made during the construction of wall 12 by suitably supporting the pipe 11 while masonry or Gunite is installed about the pipe. Usually the free right hand end of pipe 11 extends for a distance to the right of that shown in FIG. 1 and is plugged to safeguard against the entry of foreign matter during the construction period. Barrier 10 is telescoped over the end of the pipe and bonded in place in an area to be later filled with the coating 13. A suitable form is then installed about the barrier to exclude the masonry and form the deep cut-shaped concavity 20 as the masonry is filled in about the pipe.

After this material has taken a set, coping 22 is usually installed across the top edge of the wall with its inner edge projecting inwardly over the interior of the pool. Thereafter, a thick layer of water-proofing material 13 is applied, such as plaster or the like well known to those skilled in this art. Care is taken by the workman to completely fill concavity 20 with the coating material and to have it in firm contact with all exterior surfaces of barrier device 10. As this coating sets, it forms a strongly adherent bond to all surfaces of barrier 10 in contact therewith and safeguards against any possibility of water seepage past the exterior of pipe 11. After the coating 13 has taken a set the excess length of the pipe 11 may be cut off flush with the exposed surface of the coating.

While the particular water barrier to prevent seepage past pipes installed through a masonry wall herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A water barrier device for preventing seepage of water along the interface between the exterior of a pipe and a masonry wall in which a portion of the pipe length is permanently and immovably embedded, said barrier device comprising a rigid molded plastic tubular sleeve adapted to be telescoped onto and bonded to the outer surface of the portion of a pipe embraced by and in sealing contact with a waterproof coating for said masonry wall and through which coating said pipe passes, and said sleeve having wide area sealing flange means embracing and projecting outwardly therefrom adapted to be embedded in and sealed to waterproof coating for one face of said masonry wall when installed therein and cooperable therewith to prevent liquid seepage through the wall along the exterior of the pipe.

2. A water barrier device as defined in claim 1 characterized in that said flange means comprises a plurality of annular flanges spaced apart axially of said sleeve and integral therewith.

3. That improvement in a swimming pool to prevent seepage of water along the interface between a masonry pool wall and the exterior of the water pipe having a short length thereof embedded in the masonry wall below the pool water level, said improvement comprising a tubular sleeve sealingly bonded to the exterior of said pipe along a length thereof embedded in a waterproof coating for the interior surface of the pool wall, said sleeve being embraced by outwardly projecting water seepage barrier means having the surface thereof embedded in and sealingly adherent to said waterproof coating lining the interior surface of the pool wall.

4. That improvement defined in claim 3 characterized in that the inwardly facing side of said pool wall has a concavity surrounding the adjacent portion of said water pipe and having a depth adequate to accommodate the length of the pipe embraced by said tubular sleeve, and said sleeve being located within said concavity and embedded in and adherent to said waterproof coating thereby to prevent seepage of water from the pool and along the interface between said pipe and said pool wall.

* * * * *